(12) United States Patent
Dong

(10) Patent No.: US 11,647,174 B2
(45) Date of Patent: May 9, 2023

(54) METHOD FOR TESTING CROSSTALK OF SCREEN

(71) Applicant: KunShan Go-Visionox Opto-Electronics Co., Ltd, Jiangsu (CN)

(72) Inventor: Shuanzhu Dong, Kunshan (CN)

(73) Assignee: KunShan Go-Visionox Opto-Electronics Co., Ltd, Kunshan (CN)

(*) Notice: Subject to any disclaimer, the term of this patent is extended or adjusted under 35 U.S.C. 154(b) by 131 days.

(21) Appl. No.: 17/471,583

(22) Filed: Sep. 10, 2021

(65) Prior Publication Data

US 2022/0006997 A1 Jan. 6, 2022

Related U.S. Application Data

(63) Continuation of application No. PCT/CN2020/087771, filed on Apr. 29, 2020.

(30) Foreign Application Priority Data

Aug. 15, 2019 (CN) .......................... 201910753110.8

(51) Int. Cl.
*H04N 13/125* (2018.01)
*H04N 13/327* (2018.01)
(Continued)

(52) U.S. Cl.
CPC ......... *H04N 13/125* (2018.05); *H04N 13/327* (2018.05); *H04N 13/398* (2018.05); *H04N 17/04* (2013.01)

(58) Field of Classification Search
CPC .. H04N 13/125; H04N 13/327; H04N 13/398; H04N 17/04; G09G 3/006;
(Continued)

(56) References Cited

U.S. PATENT DOCUMENTS 7,328,116 B2 * 2/2008 Bala .................... H04N 17/04
348/E17.005
9,311,891 B2 * 4/2016 Hubschneider .......... G09G 5/02
(Continued)

FOREIGN PATENT DOCUMENTS

CN 102124744 A 7/2011
CN 102811363 A 12/2012
(Continued)

OTHER PUBLICATIONS

The International search report for PCT Application No. PCT/CN2020/087771, dated Jul. 13, 2020, 11 pages.
(Continued)

*Primary Examiner* — Vinh T Lam
(74) *Attorney, Agent, or Firm* — Maier & Maier, PLLC

(57) ABSTRACT

A method for testing crosstalk of a screen. The method includes when a main screen and a secondary screen simultaneously display pictures of different grayscales, determining a standard parameter value of crosstalk for each of the secondary screen and the main screen caused by the other; determining an actual parameter value of crosstalk for each of the secondary screen and the main screen caused by the other; calculating a degree of crosstalk for each of the secondary screen and the main screen caused by the other, according to the standard parameter value of crosstalk and actual parameter value of crosstalk for each of the secondary screen and the main screen caused by the other, respectively.

16 Claims, 6 Drawing Sheets

(51) Int. Cl.
*H04N 13/398* (2018.01)
*H04N 17/04* (2006.01)

(58) Field of Classification Search
CPC ........ G09G 2320/0209; H04M 1/0264; H04M 1/24; H04M 1/0266; G02F 2203/30
See application file for complete search history.

(56) References Cited

U.S. PATENT DOCUMENTS

| | | | | |
|---|---|---|---|---|
| 9,843,793 | B2 * | 12/2017 | Redmann | H04N 13/327 |
| 9,961,341 | B2 * | 5/2018 | Zhu | H04N 13/324 |
| 10,237,547 | B1 * | 3/2019 | Wu | H04N 17/045 |
| 11,074,882 | B2 * | 7/2021 | Wang | G09G 3/3648 |
| 11,184,598 | B2 * | 11/2021 | De Jong | H04N 13/31 |
| 2012/0262556 | A1 | 10/2012 | Kuwahara et al. | |
| 2014/0085432 | A1 * | 3/2014 | Wu | G09G 5/006 |
| | | | | 348/51 |
| 2014/0340417 | A1 * | 11/2014 | Tanaka | G09G 3/003 |
| | | | | 345/589 |
| 2019/0130803 | A1 * | 5/2019 | Zhang | G09G 3/006 |

FOREIGN PATENT DOCUMENTS

| | | | | | |
|---|---|---|---|---|---|
| CN | 103676346 | A | | 3/2014 | |
| CN | 105047141 | A * | | 11/2015 | ............. G09G 3/006 |
| CN | 106023942 | A * | | 10/2016 | ............. G06T 7/001 |
| CN | 107024337 | A * | | 8/2017 | ............. G01B 11/14 |
| CN | 107274848 | A | | 10/2017 | |
| CN | 108091314 | A * | | 5/2018 | |
| CN | 108287419 | A | | 7/2018 | |
| CN | 108989798 | A | | 12/2018 | |
| CN | 109074773 | A | | 12/2018 | |
| CN | 106023942 | B * | | 1/2019 | ............. G06T 7/001 |
| CN | 109801950 | A | | 5/2019 | |
| CN | 110475115 | A | | 11/2019 | |
| JP | 2015038530 | A * | | 2/2015 | ............. G09G 3/003 |
| WO | WO-2012033224 | A1 * | | 3/2012 | ............... G09G 3/20 |
| WO | WO-2013052542 | A1 * | | 4/2013 | ......... H04N 13/0018 |
| WO | WO-2013089067 | A1 * | | 6/2013 | ............. G09G 3/003 |
| WO | WO-2015096346 | A1 * | | 7/2015 | ......... H04N 13/0422 |
| WO | WO-2017133113 | A1 * | | 8/2017 | ............. G01B 11/14 |

OTHER PUBLICATIONS

The First Office Action for China Application No. 201910753110.8, dated Apr. 26, 2020, 9 pages.
The Notice of Allowance and supplementary search report for China Application No. 201910753110.8, dated Aug. 17, 2020, 6 pages.

* cited by examiner

When the secondary screen is in the first functional state, and the secondary screen and the main screen simultaneously display pictures of different grayscales, determining a standard parameter value of crosstalk for the secondary screen caused by the main screen and a standard parameter value of crosstalk for the main screen caused by the secondary screen, according to luminance of a central point of the main screen and luminance of a central point of the secondary screen ⸺ 301

Determining an actual parameter value of crosstalk for the secondary screen caused by the main screen and an actual parameter value of crosstalk for the main screen caused by the secondary screen, according to luminance of $n$ comparative test points other than the central point of the main screen on the main screen and luminance of $n$ reference test points other than the central point of the secondary screen on the secondary screen, wherein $n$ is an integer greater than or equal to one ⸺ 302

Calculating a degree of crosstalk for the secondary screen caused by the main screen, according to the standard parameter value of crosstalk for the secondary screen caused by the main screen and the actual parameter value of crosstalk for the secondary screen caused by the main screen; and calculating a degree of crosstalk for the main screen caused by the secondary screen, according to the standard parameter value of crosstalk for the main screen caused by the secondary screen and the actual parameter value of crosstalk for the main screen caused by the secondary screen. The degree of crosstalk for the secondary screen caused by the main screen and the degree of crosstalk for the main screen caused by the secondary screen are to be used to determine crosstalk interference between the main screen and the secondary screen. ⸺ 303

Fig. 3

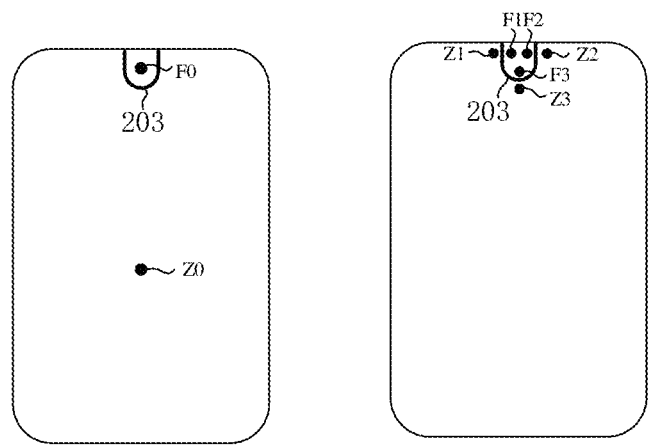

Fig. 4

METHOD FOR TESTING CROSSTALK OF SCREEN

CROSS REFERENCE TO RELATED APPLICATION

The application is a continuation of International Application No. PCT/CN2020/087771 filed on Apr. 29, 2020, which claims the priority to Chinese Patent Application No. 201910753110.8 filed on Aug. 15, 2019, both of which are incorporated herein by reference in their entireties.

TECHNICAL FIELD

The application relates to the technical field of screen testing, and particularly to a method for testing crosstalk of a screen.

BACKGROUND

Crosstalk refers to a phenomenon that, when a display panel displays pictures of two different grayscales at the same time, the pictures of different grayscales may interfere with each other. For example, when black and white pictures are displayed at the same time, the black area may become insufficiently black because of an interference of the white area, and the white area may become insufficiently white because of an interference of the black area. A display effect is thus affected.

The present method for testing crosstalk is suitable for integrated screens, but not for special-shaped screens.

SUMMARY

A purpose of the present application is to provide a method for testing crosstalk of a screen. The method can be applied to screen crosstalk testing for special-shaped screens, and improve the accuracy of the screen crosstalk testing for the special-shaped screens.

In a first aspect, an embodiment of the present application provides a method for testing crosstalk of a screen comprising a main screen and a secondary screen that has at least a first functional state and a second functional state and displays a picture together with the main screen in the first functional state. The method for testing crosstalk of a screen comprises:

when the secondary screen is in the first functional state and the secondary screen and the main screen simultaneously display pictures of different grayscales, determining a standard parameter value of crosstalk for the secondary screen caused by the main screen and a standard parameter value of crosstalk for the main screen caused by the secondary screen, according to luminance of a central point of the main screen and luminance of a central point of the secondary screen;

determining an actual parameter value of crosstalk for the secondary screen caused by the main screen and an actual parameter value of crosstalk for the main screen caused by the secondary screen, according to luminance of n comparative test points other than the central point of the main screen on the main screen and luminance of n reference test points other than the central point of the secondary screen on the secondary screen, wherein n is an integer greater than or equal to one, and the n comparative test points and the n reference test points are set in a one-to-one correlation;

calculating a degree of crosstalk for the secondary screen caused by the main screen, according to the standard parameter value of crosstalk for the secondary screen caused by the main screen and the actual parameter value of crosstalk for the secondary screen caused by the main screen; and calculating a degree of crosstalk for the main screen caused by the secondary screen, according to the standard parameter value of crosstalk for the main screen caused by the secondary screen and the actual parameter value of crosstalk for the main screen caused by the secondary screen, wherein the degree of crosstalk for the secondary screen caused by the main screen and the degree of crosstalk for the main screen caused by the secondary screen are to be used to determine crosstalk interference between the main screen and the secondary screen.

As described above, of a screen structure having a main screen and a secondary screen, embodiments of the present application calculate the degree of crosstalk for the secondary screen caused by the main screen, according to the standard parameter value of crosstalk for the secondary screen caused by the main screen and the actual parameter value of crosstalk for the secondary screen caused by the main screen firstly, and then calculate the degree of crosstalk for the main screen caused by the secondary screen, according to the standard parameter value of crosstalk for the main screen caused by the secondary screen and the actual parameter value of crosstalk for the main screen caused by the secondary screen, and finally, determine the crosstalk interference between the main screen and the secondary screen according to the degree of crosstalk for the secondary screen caused by the main screen and the degree of crosstalk for the main screen caused by the secondary screen, whereby the crosstalk interference between the main screen and the secondary screen can be measured comprehensively and accurately. The embodiments of the present application may be applied to test crosstalk for special-shaped screens and improve the accuracy of the crosstalk testing for the special-shaped screens.

In addition, when calculating the standard parameter value of crosstalk, the embodiments of the present application choose to use the luminance of the central point of the main screen and the luminance of the central point of the secondary screen as bases, so as to adapt to the actual grayscale pictures as displayed, and be closer to the real display state and have higher accuracy, as compared with using a preset value.

BRIEF DESCRIPTION OF THE DRAWINGS

Features, advantages, and technical effects of embodiments of the present application will be described with reference to the accompanying drawings below. The accompanying drawings are not drawn to real scale.

FIG. 3 is a schematic flowchart of a method for testing crosstalk of a screen provided by an embodiment of the present application.

FIG. 4 is a schematic diagram of distribution of test points on a main screen and a secondary screen provided by an embodiment of the present application.

DETAILED DESCRIPTION

Features and exemplary embodiments according to various aspects of the present application will be described in details below. A plenty of details are provided in the detailed description below, so as to provide comprehensive understanding of the application.

Figure 1:
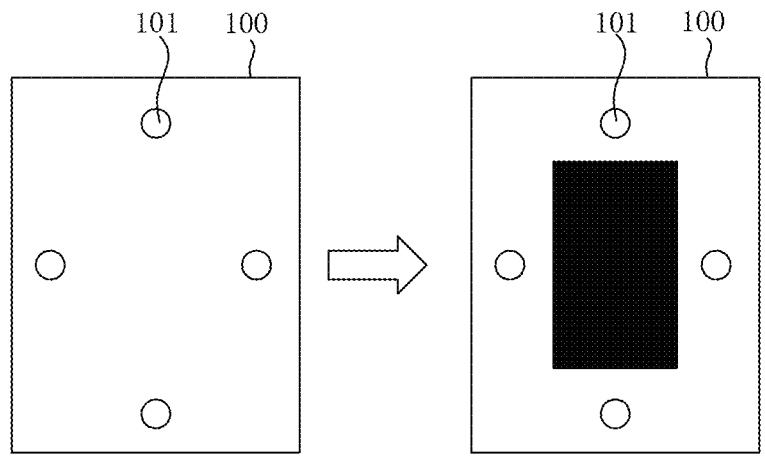
FIG. 1 is a schematic diagram of distribution of test points in a general method for testing crosstalk.

As shown in FIG. 1, a method for testing crosstalk includes displaying a pure white picture on a display panel 100; testing a first luminance value of multiple test points 101 which are not located in a center area of the pure white picture; displaying a pure black picture in a center area of the display panel 100 and a pure white picture in the surrounding areas of the center area of the display panel 100; testing a second luminance value of the multiple test points 101; calculating a difference value between the first luminance value and the second luminance value for the multiple test points 101; determining that the display panel does not pass the crosstalk test, when the difference value between the first luminance value and the second luminance value for one or more of the multiple test points 101 is greater than a preset threshold. The method for testing crosstalk is suitable for integrated screens.

Figure 2:
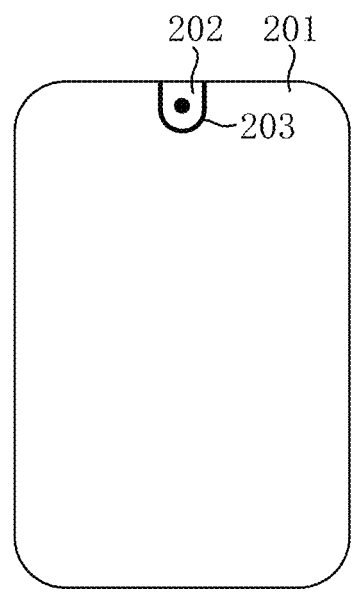
FIG. 2 is a schematic diagram of a structure of a special-shaped screen.

As shown in FIG. 2, a special-shaped screen may include a main screen 201 and a secondary screen 202. In FIG. 2, label 203 exhibits the contour line of the secondary screen 202.

The secondary screen 202 shown in FIG. 2 has a shape and position matching a camera. In some embodiments, the secondary screen 202 may have shapes, number, and positions in other forms. For example, shapes of the secondary screen 202 may be rectangular, circular, etc., the number of the secondary screen 202 may be more than one, and the secondary screen 202 may be positioned in the marginal or corner area, which are not limited herein.

The secondary screen 202 may have at least a first functional state and a second functional state. The first functional state here may include a display function, and the second functional state may include a camera function. When the secondary screen 202 displays pictures together with the main screen 201 in the first functional state, the pictures may be presented in a full-screen mode. During a production process of the special-shaped screen, a space may be reserved for the secondary screen 202 when the main screen 201 is produced, so as to further produce the secondary screen 202 on a basis of the main screen 201. Since the main screen 201 and the secondary screen 202 are produced separately, there may be differences in aspects such as the driving mode, pixel structure, relative position layout, etc. between them.

Inventors of the present application found that the above-mentioned method for testing crosstalk suitable for integrated screens, is not suitable for the special-shaped screen as shown in FIG. 2, which includes the main screen 201 and the secondary screen 202 designed separately, since the main screen 201 and the secondary screen 202 are different in aspects such as the driving mode, pixel structure, relative position layout, etc.

FIG. 3 is a schematic flowchart of a method for testing crosstalk of a screen provided by an embodiment of the present application. The method may be applied to a special-shaped screen including a main screen and a secondary screen designed separately. As shown in FIG. 3, the method for testing crosstalk of a screen may include Step 301 to Step 303.

In Step 301, when the secondary screen in a first functional state, and the secondary screen and the main screen simultaneously display pictures of different grayscales, a standard parameter value of crosstalk for the secondary screen caused by the main screen and a standard parameter value of crosstalk for the main screen caused by the secondary screen are determined according to luminance of a central point of the main screen and luminance of a central point of the secondary screen.

Since crosstalk between the main screen and the secondary screen is mainly distributed in close areas, there is no crosstalk between the central point of the main screen and the central point of the secondary screen. The standard parameter value of crosstalk for the secondary screen caused by the main screen and the standard parameter value of crosstalk for the main screen caused by the secondary screen thus can be determined according to the luminance of the central point of the main screen and the luminance of the central point of the secondary screen when the main screen and the secondary screen display pictures of different grayscales from each other.

In the embodiment, the standard parameter value of crosstalk may be a parameter value when the crosstalk is 0.

In the step, since the luminance of the central point of the main screen and the luminance of the central point of the secondary screen can reflect the state when the crosstalk between the main screen and the secondary screen is 0, determining the standard parameter value of crosstalk for the secondary screen caused by the main screen and the standard parameter value of crosstalk for the main screen caused by the secondary screen, according to the luminance of the central point of the main screen and the luminance of the central point of the secondary screen, when the main screen and the secondary screen display the pictures of different grayscales, can adapt to the actual grayscale pictures as displayed, and is closer to the real display state and has higher accuracy, as compared with using a preset value.

In Step 302, an actual parameter value of crosstalk for the secondary screen caused by the main screen and an actual parameter value of crosstalk for the main screen caused by the secondary screen are determined according to luminance of n comparative test points other than the central point of the main screen on the main screen and luminance of n reference test points other than the central point of the secondary screen on the secondary screen, where n is an integer greater than or equal to one. The n comparative test points and the n reference test points are set in a one-to-one correlation.

In the embodiment, the actual parameter value of crosstalk is a corresponding parameter value when the crosstalk is not 0. Therefore, the actual parameter value of crosstalk for the secondary screen caused by the main screen and the actual parameter value of crosstalk for the main screen caused by the secondary screen may be determined from the luminance of each of the n comparative test points other than the central point of the main screen on the main screen and the luminance of each of the n reference test points other than the central point of the secondary screen on the secondary screen.

Since an area of the secondary screen is much smaller than an area of the main screen, positions of the n reference test points on the secondary screen may be selected firstly, and positions of the n comparative test points on the main screen may then be selected correspondingly.

In some embodiments, the crosstalk between the main screen and the secondary screen is mainly distributed in close areas between them, that is, the closer the main screen and the secondary screen, the greater the interference. Therefore, the n reference test points other than the central point of the secondary screen on the secondary screen may be evenly distributed in marginal areas of the secondary screen adjacent to the main screen; and the n comparative test points other than the central point of the main screen on the main screen may be positioned in marginal areas of the main screen adjacent to the secondary screen. For each of the n reference test points other than the central point of the secondary screen on the secondary screen, there may be one comparative test point in an marginal area of the main screen adjacent to the secondary screen, and n comparative test points and n reference test points have one-to-one correspondence relationships to form n test groups may be located outside and inside the contour line 203 of the secondary screen respectively. As such, the actual parameter value of crosstalk for the secondary screen caused by the main screen and the actual parameter value of crosstalk for the main screen caused by the secondary screen may be calculated comprehensively and accurately.

As shown in FIG. 4, Z0 is the central point of the main screen, which is located at the center of the main screen; F0 is the central point of the secondary screen, which located at the center of the secondary screen. There is no crosstalk between the central point of the main screen and the central point of the secondary screen, since Z0 and F0 are far apart.

F1, F2, F3 are 3 reference test points evenly distributed on the marginal areas of the secondary screen adjacent to the main screen, and Z1, Z2, Z3 are 3 comparative test points on the marginal areas of the main screen adjacent to the secondary screen. Z1 is the comparative test point on the marginal area of the main screen adjacent to F1. Z1 and F1 form a test group. Z2 is the comparative test point on the marginal area of the main screen adjacent to F2. Z2 and F2 form a test group. Z3 is the comparative test point on the marginal area of the main screen adjacent to F3. Z3 and F3 form a test group.

In some embodiments, in order to improve the calculation accuracy of the actual parameter value of crosstalk for the secondary screen caused by the main screen and the actual parameter value of crosstalk for the main screen caused by the secondary screen, for each test group of n test groups, a distance from the comparative test point to the contour line 203 of the secondary screen may be equal to a distance from the reference test point to the contour line 203 of the secondary screen of the reference test point.

In some embodiments, F1, F2, and F3 may be evenly distributed around the center of the secondary screen, so as to improve the test accuracy. When the main screen is arranged to surround the secondary screen, in n test groups each formed of one of the n comparative test points and a corresponding one of the n reference test points, an extension line of a connecting line between the comparative test point and the reference test point in each of the test groups may pass through the center of the secondary screen. That is to say, the extension line of the connecting line between Z1 and F1, the extension line of the connecting line between Z2 and F2, and the extension line of the connecting line between Z3 and F3 may intersect and pass through the center of the secondary screen, so as to improve the calculation accuracy of the actual parameter value of crosstalk for the secondary screen caused by the main screen and the actual parameter value of crosstalk for the main screen.

In addition to the central point Z0 of the main screen and the central point F0 of the secondary screen, FIG. 4 also shows three non-central test points (Z1, Z2, Z3 and F1, F2, F3) for the main screen and the secondary screen respectively. The larger the number of the non-central test points, the more accurate the calculation result. But more calculation resources will be occupied and more time will be taken at the same time. Therefore, an appropriate number of the non-central test points may be chosen depending on the actual situation, which is not limited herein.

In Step 303, a degree of crosstalk for the secondary screen caused by the main screen is calculated according to the standard parameter value of crosstalk for the secondary screen caused by the main screen and the actual parameter value of crosstalk for the secondary screen caused by the main screen, and a degree of crosstalk for the main screen caused by the secondary screen is calculated according to the standard parameter value of crosstalk for the main screen caused by the secondary screen and the actual parameter value of crosstalk for the main screen caused by the secondary screen.

In the embodiment, the degree of crosstalk for the secondary screen caused by the main screen and the degree of crosstalk for the main screen caused by the secondary screen may be used to determine crosstalk interference between the main screen and the secondary screen.

Because of differences in the driving mode and pixel structure between the main screen and the secondary screen, crosstalk interference for the secondary screen caused by the main screen and crosstalk interference for the main screen caused by the secondary screen may be different. The crosstalk interference between the main screen and the secondary screen may be measured more comprehensively and accurately, by calculating the crosstalk interference for the secondary screen caused by the main screen and the crosstalk interference for the main screen caused by the secondary screen at the same time.

As described above, of a screen structure having a main screen and a secondary screen, embodiments of the present application calculate the degree of crosstalk for the secondary screen caused by the main screen, according to the standard parameter value of crosstalk for the secondary screen caused by the main screen and the actual parameter value of crosstalk for the secondary screen caused by the main screen firstly, and then calculate the degree of crosstalk for the main screen caused by the secondary screen, according to the standard parameter value of crosstalk for the main screen caused by the secondary screen and the actual parameter value of crosstalk for the main screen caused by the secondary screen, and finally, determine the crosstalk interference between the main screen and the secondary screen according to the degree of crosstalk for the secondary screen caused by the main screen and the degree of crosstalk for the main screen caused by the secondary screen, whereby the crosstalk interference between the main screen and the secondary screen can be measured comprehensively and accurately. The embodiments of the present application may be applied to test crosstalk for special-shaped screens and improve the accuracy of the crosstalk testing for the special-shaped screens.

In addition, when calculating the standard parameter value of crosstalk, the embodiments of the present application choose to use the luminance of the central point of the main screen and the luminance of the central point of the secondary screen as bases, so as to adapt to the actual grayscale pictures as displayed, and be closer to the real display state and have higher accuracy, as compared with using a preset value.

In the embodiment of the present application, a unit of the luminance may be $cd/m^2$, which is used to indicate a degree of luminance of a luminous surface, and refers particularly to a ratio of an intensity of luminance of the luminous surface in a specified direction to an area of the luminous surface perpendicular to the specified direction. A unit of the luminance may also be Nit (Nt), which is used to indicate a luminous flux per unit area and unit solid angle.

Figure 5:
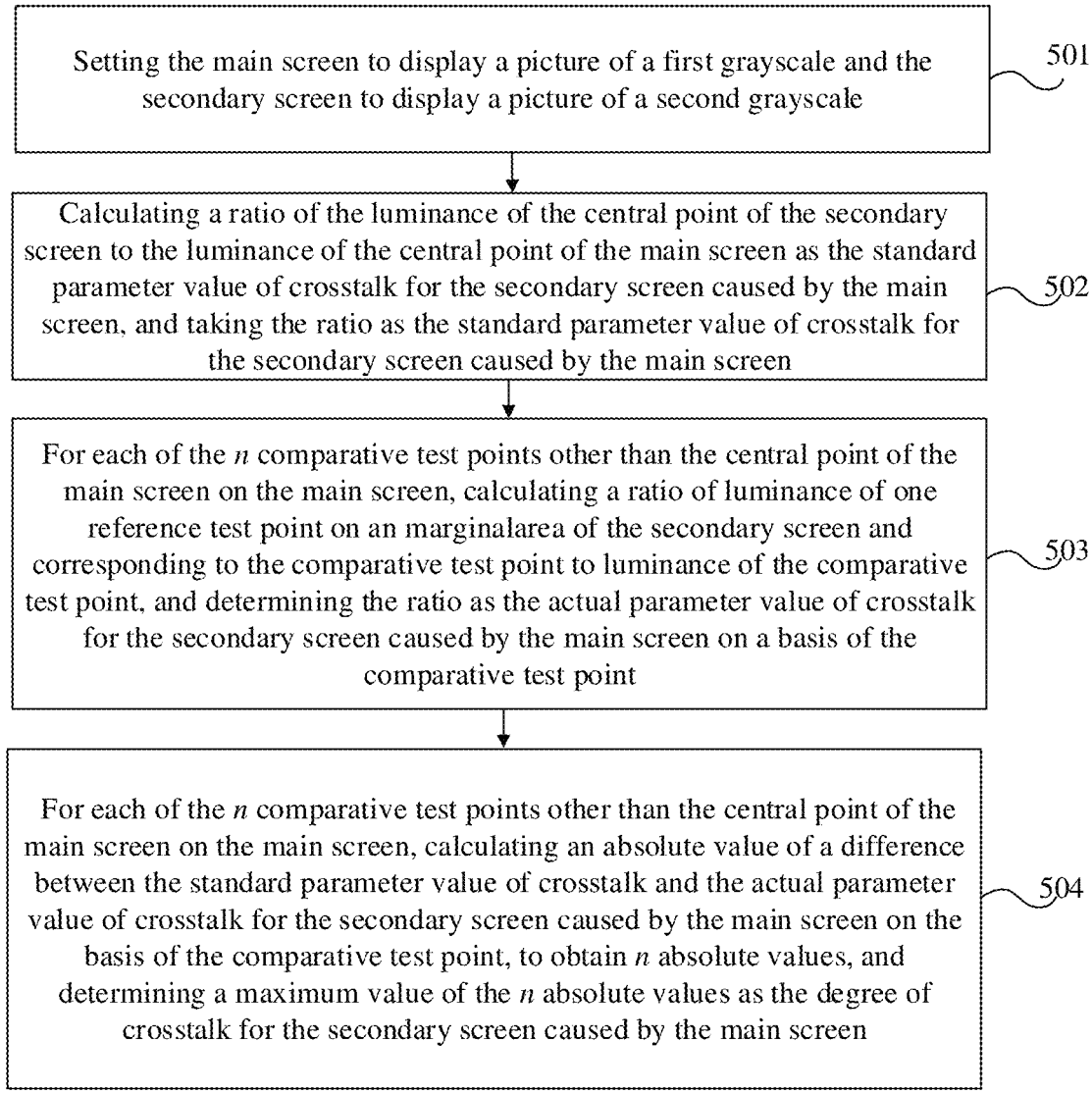
FIG. 5 is a schematic flowchart of a method for calculating a degree of crosstalk for a secondary screen caused by a main screen provided by an embodiment of the present application.

A method for calculating the degree of crosstalk for the secondary screen caused by the main screen is illustrated in conjunction with FIG. 5 and FIG. 6 below.

Figure 6:
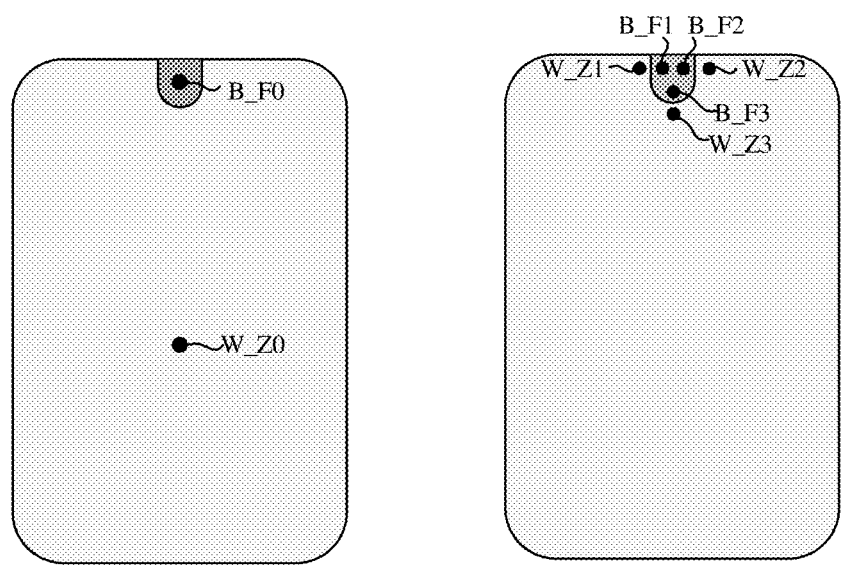
FIG. 6 is a schematic diagram of test points with labels when a main screen is displaying a picture of a first grayscale and a secondary screen is displaying a picture of a second grayscale, provided by an embodiment of the present application.

In Step 501, the main screen is set to display a picture of a first grayscale and the secondary screen is set to display a picture of a second grayscale, as can be seen from FIG. 6. The first grayscale is greater than the second grayscale. The first grayscale is denoted with symbol W and the second grayscale is denoted with symbol B.

Correspondingly, the luminance of the central point Z0 of the main screen is demoted as W_Z0, the luminance of the comparative test point Z1 of the main screen is demoted as W_Z1, the luminance of the comparative test point Z2 of the main screen is demoted as W_Z2, and the luminance of the comparative test point Z3 of the main screen is demoted as W_Z3. The luminance of the central point F0 of the secondary screen is demoted as B_F0, the luminance of the reference test point F1 of the secondary screen is demoted as B_F1, the luminance of the reference test point F2 of the secondary screen is demoted as B_F2, and the luminance of the reference test point F3 of the secondary screen is demoted as B_F3.

In Step 502, a ratio of the luminance of the central point of the secondary screen to the luminance of the central point of the main screen as the standard parameter value of crosstalk for the secondary screen caused by the main screen is calculated and taken as the standard parameter value of crosstalk for the secondary screen caused by the main screen.

Exemplarily, if the standard parameter value of crosstalk for the secondary screen caused by the main screen is denoted by S1, then $$S1=B\_F0/W\_Z0 \quad (1)$$

In Step 503, for each of the n comparative test points other than the central point of the main screen on the main screen, a ratio of luminance of one reference test point on an marginal area of the secondary screen and corresponding to the comparative test point to luminance of the comparative test point is calculated, and determined as the actual parameter value of crosstalk for the secondary screen caused by the main screen on a basis of the comparative test point.

Exemplarily, if the actual parameter value of crosstalk for the secondary screen caused by the main screen on a basis of a comparative test point i is denoted by RZi, then $$RZ1=B\_F1/W\_Z1 \quad (2)$$

$$RZ2=B\_F2/W\_Z2 \quad (3)$$

$$RZ3=B\_F3/W\_Z3 \quad (4)$$

In Step 504, for each of the n comparative test points other than the central point of the main screen on the main screen, an absolute value of a difference between the standard parameter value of crosstalk and the actual parameter value of crosstalk for the secondary screen caused by the main screen on the basis of the comparative test point is calculated to obtain n absolute values, and a maximum value of the n absolute values is determined as the degree of crosstalk for the secondary screen caused by the main screen.

Exemplarily, if the degree of crosstalk for the secondary screen caused by the main screen is denoted by D1, then $$D1=\max|S1-RZi| \quad (5)$$

Exemplarily, a threshold of the degree of crosstalk for the secondary screen caused by the main screen (i.e., a first crosstalk degree threshold) is denoted by Q1. Crosstalk interference for the secondary screen caused by the main screen may be determined to meet a quality requirement, when D1<Q1.

Figure 7:
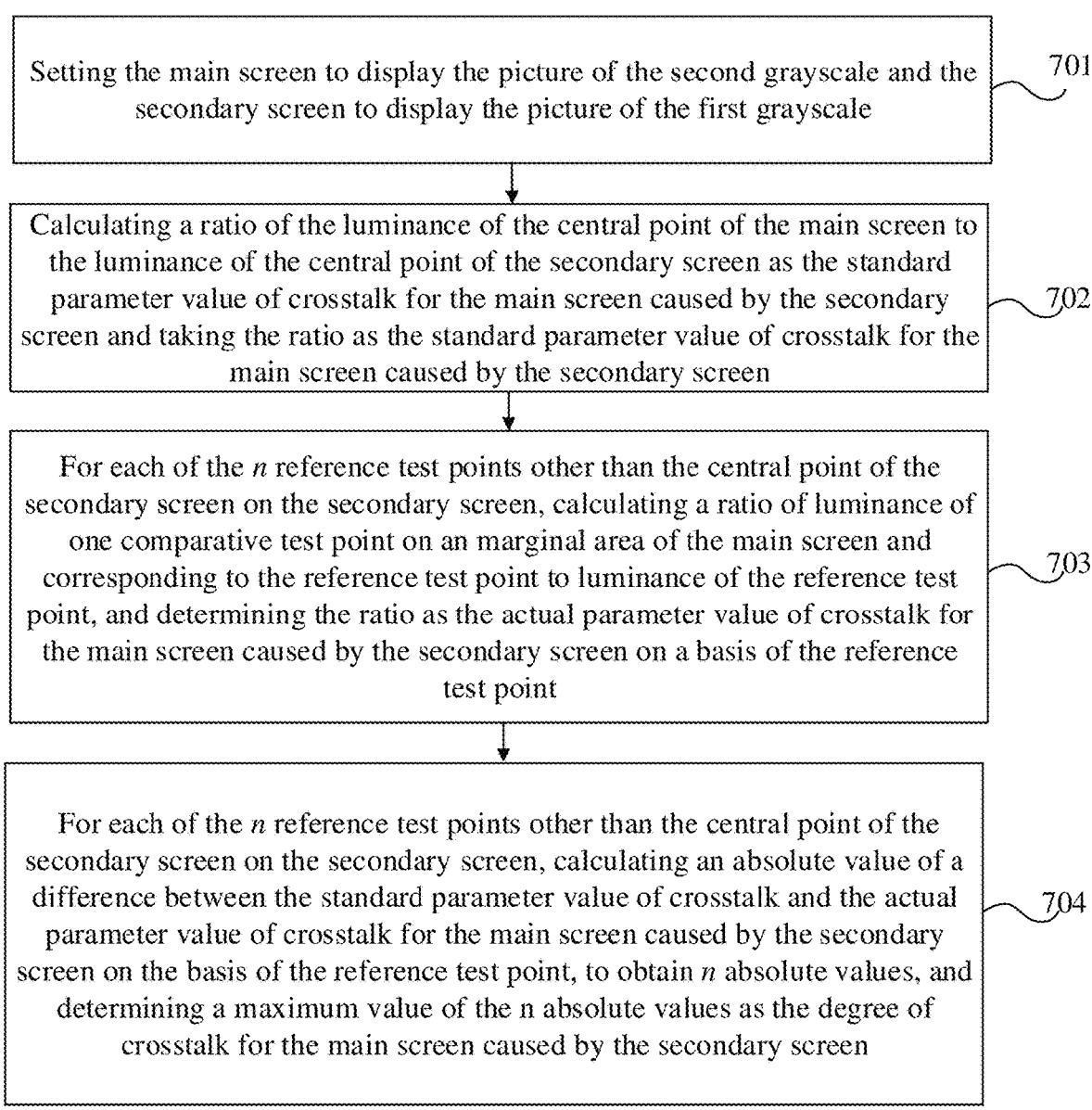
FIG. 7 is a schematic flowchart of a method for calculating a degree of crosstalk for a main screen caused by a secondary screen provided by an embodiment of the present application.

A method for calculating the degree of crosstalk for the main screen caused by the secondary screen is illustrated in conjunction with FIG. 7 and FIG. 8 below.

Figure 8:
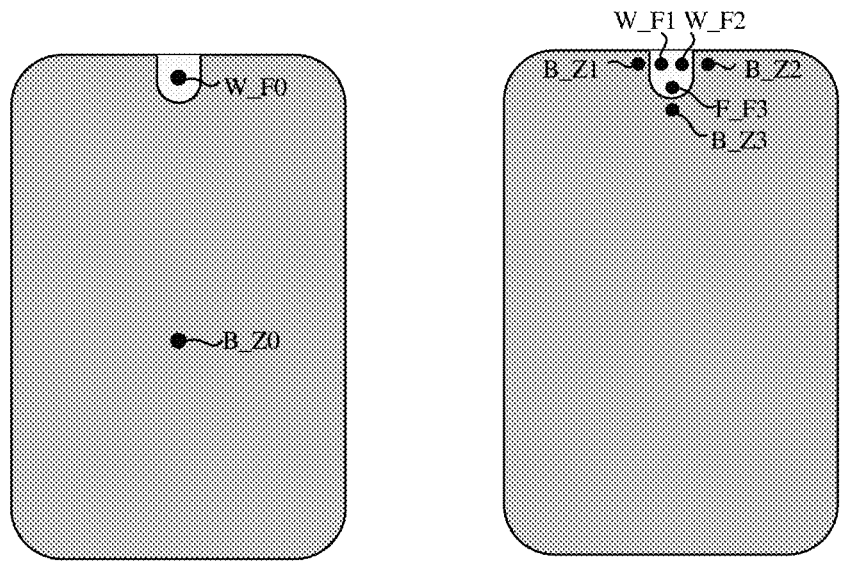
FIG. 8 is a schematic diagram of test points with labels when a main screen is displaying a picture of a second grayscale and a secondary screen is displaying a picture of a first grayscale, provided by an embodiment of the present application.

In Step 701, the main screen is set to display the picture of the second grayscale and the secondary screen is set to display the picture of the first grayscale, as can be seen from FIG. 8. The first grayscale is greater than the second grayscale. The first grayscale is denoted with symbol W and the second grayscale is denoted with symbol B.

Correspondingly, the luminance of the central point Z0 of the main screen is demoted as B_Z0, the luminance of the comparative test point Z1 of the main screen is demoted as B_Z1, the luminance of the comparative test point Z2 of the main screen is demoted as B_Z2, and the luminance of the comparative test point Z3 of the main screen is demoted as B_Z3. The luminance of the central point F0 of the secondary screen is demoted as W_F0, the luminance of the reference test point F1 of the secondary screen is demoted as W_F1, the luminance of the reference test point F2 of the secondary screen is demoted as W_F2, and the luminance of the reference test point F3 of the secondary screen is demoted as W_F3.

In Step 702, a ratio of the luminance of the central point of the main screen to the luminance of the central point of the secondary screen as the standard parameter value of crosstalk for the main screen caused by the secondary screen is calculated and taken as the standard parameter value of crosstalk for the main screen caused by the secondary screen.

Exemplarily, if the standard parameter value of crosstalk for the main screen caused by the secondary screen is denoted by S2, then $$S2=B\_Z0/W\_F0 \quad (6)$$

In Step 703, for each of the n reference test points other than the central point of the secondary screen on the secondary screen, a ratio of luminance of one comparative test point on an marginal area of the main and corresponding to the reference test point to luminance of the reference test point is calculated, and determined as the actual parameter value of crosstalk for the main screen caused by the secondary screen on a basis of the reference test point.

Exemplarily, if the actual parameter value of crosstalk for the main screen caused by the secondary screen on a basis of a reference test point i is denoted by RFi, then $$RF1 = B\_Z1/W\_F1 \qquad (7)$$

$$RF2 = B\_Z2/W\_F2 \qquad (8)$$

$$RF3 = B\_Z3/W\_F3 \qquad (9)$$

In Step 704, for each of the n reference test points other than the central point of the secondary screen on the secondary screen, an absolute value of a difference between the standard parameter value of crosstalk and the actual parameter value of crosstalk for the main screen caused by the secondary screen on the basis of the reference test point is calculated to obtain n absolute values, and a maximum value of the n absolute values is determined as the degree of crosstalk for the main screen caused by the secondary screen.

Exemplarily, if the degree of crosstalk for the main screen caused by the secondary screen is denoted by D2, then $$D2 = \max |S2 - RFi| \qquad (10)$$

Exemplarily, a threshold of the degree of crosstalk for the main screen caused by the secondary screen (i.e., a second crosstalk degree threshold) is denoted by Q2. Crosstalk interference for the main screen caused by the secondary screen may be determined to meet the quality requirement, when D2<Q2.

Values of Q1 and Q2 may be provided by customers, they can be equal or unequal, which is not limited herein.

The crosstalk interference between the main screen and the secondary screen may be determined to meet the quality requirement, when both the crosstalk interference for the secondary screen caused by the main screen and the crosstalk interference for the main screen caused by the secondary screen meet the quality requirement. That is to say, overall interference of crosstalk of the screen meets the quality requirement.

When describing that the main screen and the secondary screen display pictures of different grayscales above, it is only limited that the first grayscale is greater than the second grayscale, particular values of the grayscales are not defined. For example, the first grayscale may be 255 (displayed as pure white) and the second grayscale may be 0 (displayed as pure black). Both the first grayscale and the second grayscale may be between 0 and 255 (displayed as grayscales).

Since crosstalk between two grayscales of 127 and 255 is more serious, the first grayscale may be set to be 255 and the second grayscale may be set to be 127, in order to reflect the interference of crosstalk between the main screen and the secondary screen in the full screen more quickly, accurately and effectively.

Figure 9:
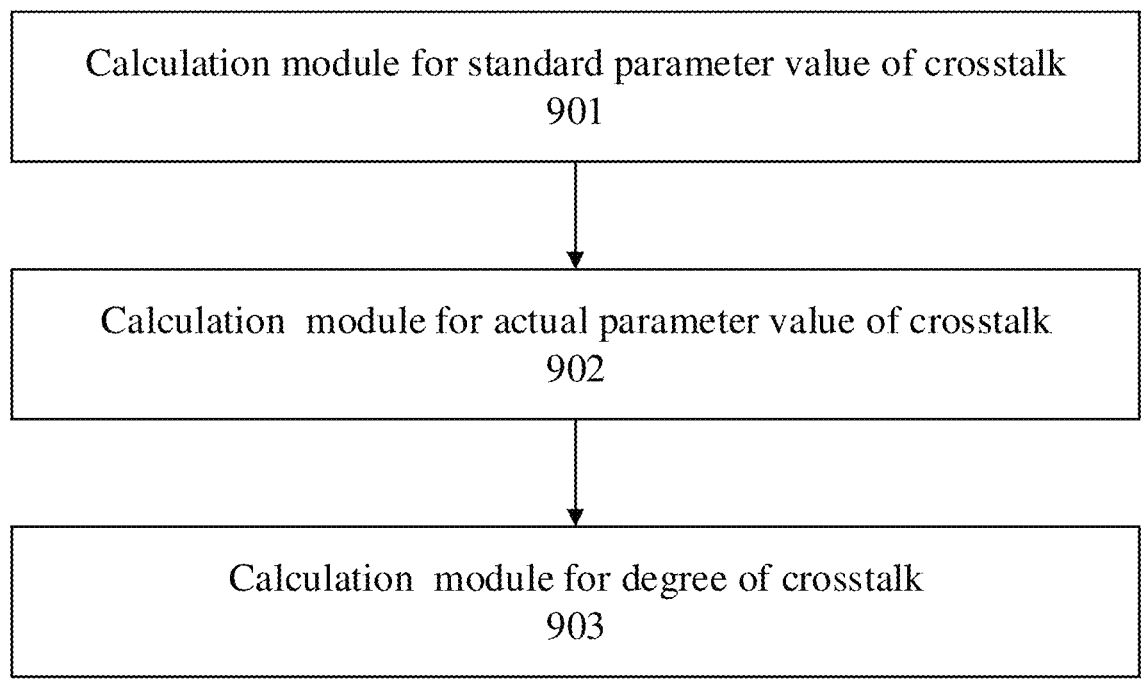
FIG. 9 is a schematic diagram of a structure of an apparatus for testing crosstalk of a screen provided by an embodiment of the present application.

FIG. 9 is a schematic diagram of a structure of an apparatus for testing crosstalk of a screen provided by an embodiment of the present application. The explanations for FIG. 3 may be applied to this embodiment.

As shown in FIG. 9, the apparatus for testing crosstalk of a screen may include a calculation module for standard parameter value of crosstalk 901 (which has functions corresponding to Step 301), a calculation module for actual parameter value of crosstalk 902 (which has functions corresponding to Step 302), and a calculation module for degree of crosstalk 903 (which has functions corresponding to Step 303).

The calculation module for standard parameter value of crosstalk 901 is used to provide pictures of different grayscales for the main screen and the secondary screen, and determine a standard parameter value of crosstalk for the secondary screen caused by the main screen and a standard parameter value of crosstalk for the main screen caused by the secondary screen, according to luminance of a central point of the main screen and luminance of a central point of the secondary screen.

The calculation module for actual parameter value of crosstalk 902 is used to determine an actual parameter value of crosstalk for the secondary screen caused by the main screen and an actual parameter value of crosstalk for the main screen caused by the secondary screen, according to luminance of n comparative test points other than the central point of the main screen on the main screen and luminance of each of n reference test points other than the central point of the secondary screen on the secondary screen, where n is an integer greater than or equal to one.

The calculation module for degree of crosstalk 903 is used to calculate a degree of crosstalk for the secondary screen caused by the main screen according to the standard parameter value of crosstalk for the secondary screen caused by the main screen and the actual parameter value of crosstalk for the secondary screen caused by the main screen, and calculate a degree of crosstalk for the main screen caused by the secondary screen according to the standard parameter value of crosstalk for the main screen caused by the secondary screen and the actual parameter value of crosstalk for the main screen caused by the secondary screen.

The degree of crosstalk for the secondary screen caused by the main screen and the degree of crosstalk for the main screen caused by the secondary screen may to be used to determine crosstalk interference between the main screen and the secondary screen.

The apparatus for testing crosstalk of a screen may be a processing element having independent calculation functions, or may be integrated into an existing apparatus for testing crosstalk of a screen, which is not limited herein.

As described above, of a screen structure having a main screen and a secondary screen, embodiments of the present application calculate the degree of crosstalk for the secondary screen caused by the main screen, according to the standard parameter value of crosstalk for the secondary screen caused by the main screen and the actual parameter value of crosstalk for the secondary screen caused by the main screen firstly, and then calculate the degree of crosstalk for the main screen caused by the secondary screen, according to the standard parameter value of crosstalk for the main screen caused by the secondary screen and the actual parameter value of crosstalk for the main screen caused by the secondary screen, and finally, determine the crosstalk interference between the main screen and the secondary screen according to the degree of crosstalk for the secondary screen caused by the main screen and the degree of crosstalk for the main screen caused by the secondary screen, whereby the crosstalk interference between the main screen and the secondary screen can be measured comprehensively and accurately. The embodiments of the present application may be applied to test crosstalk for special-shaped screens and improve the accuracy of the crosstalk testing for the special-shaped screens.

An embodiment of the present application also provides a storage medium having programs stored thereon. The programs, when executed by a processor, may implement the method for testing crosstalk for a scree as described above.

Although the present application has been described with reference to preferred embodiments, various modifications may be made thereto and components thereof may be replaced with equivalents, without departing from the scope of the present application. In particular, as long as there is no structural conflict, the technical features mentioned in various embodiments may be combined in any manner. The present application is not limited to the specific embodiments disclosed herein, instead, it may include all technical solutions that fall within the scope of the claims.

What is claimed is:

1. A method for testing crosstalk of a screen, the screen comprising a main screen and a secondary screen that has at least a first functional state and a second functional state and displays a picture together with the main screen in the first functional state, the method comprising:
   when the secondary screen is in the first functional state and the secondary screen and the main screen simultaneously display pictures of different grayscales, determining a standard parameter value of crosstalk for the secondary screen caused by the main screen and a standard parameter value of crosstalk for the main screen caused by the secondary screen, according to luminance of a central point of the main screen and luminance of a central point of the secondary screen;
   determining an actual parameter value of crosstalk for the secondary screen caused by the main screen and an actual parameter value of crosstalk for the main screen caused by the secondary screen, according to luminance of n comparative test points other than the central point of the main screen on the main screen and luminance of n reference test points other than the central point of the secondary screen on the secondary screen, wherein n is an integer greater than or equal to one and the n comparative test points and the n reference test points are set in a one-to-one correlation;
   calculating a degree of crosstalk for the secondary screen caused by the main screen, according to the standard parameter value of crosstalk for the secondary screen caused by the main screen and the actual parameter value of crosstalk for the secondary screen caused by the main screen; and
   calculating a degree of crosstalk for the main screen caused by the secondary screen, according to the standard parameter value of crosstalk for the main screen caused by the secondary screen and the actual parameter value of crosstalk for the main screen caused by the secondary screen,
   wherein the degree of crosstalk for the secondary screen caused by the main screen and the degree of crosstalk for the main screen caused by the secondary screen are to be used to determine crosstalk interference between the main screen and the secondary screen.

2. The method of claim 1, wherein the n reference test points are evenly distributed in marginal areas of the secondary screen adjacent to the main screen; and
   for each of the n reference test points, there is one comparative test point in a marginal area of the main screen adjacent to the secondary screen, n comparative test points and n reference test points have one-to-one correspondence relationships to form n test groups, and the comparative test point and the reference test point are located outside and inside a contour line of the secondary screen respectively.

3. The method of claim 2, wherein for each test group of n test groups, a distance between the comparative test point and the contour line of the secondary screen is equal to a distance between the reference test point and the contour line of the secondary screen.

4. The method of claim 2, wherein for each test group of n test groups, an extension line of a connecting line between the comparative test point and the reference test point passes through the central point of the secondary screen.

5. The method of claim 1, wherein determining the standard parameter value of crosstalk for the secondary screen caused by the main screen and the standard parameter value of crosstalk for the main screen caused by the secondary screen, according to the luminance of the central point of the main screen and the luminance of the central point of the secondary screen comprises:
   taking a ratio of the luminance of the central point of the secondary screen to the luminance of the central point of the main screen as the standard parameter value of crosstalk for the secondary screen caused by the main screen, when the main screen is displaying a picture of a first grayscale and the secondary screen is displaying a picture of a second grayscale; and
   taking a ratio of the luminance of the central point of the main screen to the luminance of the central point of the secondary screen as the standard parameter value of crosstalk for the main screen caused by the secondary screen, when the main screen is displaying the picture of the second grayscale and the secondary screen is displaying the picture of the first grayscale,
   wherein the first grayscale is greater than the second grayscale.

6. The method of claim 1, wherein determining the actual parameter value of crosstalk for the secondary screen caused by the main screen and the actual parameter value of crosstalk for the main screen caused by the secondary screen, according to the luminance of each of n comparative test points other than the central point of the main screen on the main screen and the luminance of each of n reference test points other than the central point of the secondary screen on the secondary screen comprises:
   when the main screen is displaying a picture of a first grayscale and the secondary screen is displaying a picture of a second grayscale, for each of the n comparative test points other than the central point of the main screen on the main screen, calculating a ratio of luminance of one reference test point on the secondary screen corresponding to the comparative test point to luminance of the comparative test point, and determining the ratio as a comparative test point based actual parameter value of crosstalk for the secondary screen caused by the main screen; and
   when the main screen is displaying the picture of the second grayscale and the secondary screen is displaying the picture of the first grayscale, for each of the n reference test points other than the central point of the secondary screen on the secondary screen, calculating a ratio of luminance of one comparative test point on the main screen corresponding to the reference test point to luminance of the reference test point, and determining the ratio as a reference test point based actual parameter value of crosstalk for the main screen caused by the secondary screen;
   wherein the first grayscale is greater than the second grayscale.

7. The method of claim 5, wherein the first grayscale is 255 and the second grayscale is 127, or the first grayscale is 255 and the second grayscale is 0.

8. The method of claim 6, wherein the first grayscale is 255 and the second grayscale is 127, or the first grayscale is 255 and the second grayscale is 0.

9. The method of claim 1, wherein calculating the degree of crosstalk for the secondary screen caused by the main screen, according to the standard parameter value of crosstalk for the secondary screen caused by the main screen and the actual parameter value of crosstalk for the secondary screen caused by the main screen comprises:
for each of the n comparative test points other than the central point of the main screen on the main screen, calculating an absolute value of a difference between the standard parameter value and the actual parameter value of crosstalk for the secondary screen caused by the main screen on a basis of the comparative test point to obtain n absolute values, and determining a maximum value of the n absolute values as the degree of crosstalk for the secondary screen caused by the main screen.

10. The method of claim 1, wherein calculating the degree of crosstalk for the main screen caused by the secondary screen, according to the standard parameter value of crosstalk for the main screen caused by the secondary screen and the actual parameter value of crosstalk for the main screen caused by the secondary screen comprises:
for each of the n reference test points other than the central point of the secondary screen on the secondary screen, calculating an absolute value of a difference between the standard parameter value and the actual parameter value of crosstalk for the main screen caused by the secondary screen on a basis of the reference test point to obtain n absolute values, and determining a maximum value of the n absolute values as the degree of crosstalk for the main screen caused by the secondary screen.

11. The method of claim 1, wherein after calculating the degree of crosstalk for the secondary screen caused by the main screen, according to the standard parameter value of crosstalk for the secondary screen caused by the main screen and the actual parameter value of crosstalk for the secondary screen caused by the main screen, and calculating the degree of crosstalk for the main screen caused by the secondary screen, according to the standard parameter value of crosstalk for the main screen caused by the secondary screen and the actual parameter value of crosstalk for the main screen caused by the secondary screen, the method further comprises:
determining that crosstalk interference for the secondary screen caused by the main screen meets a quality requirement, when the degree of crosstalk for the secondary screen caused by the main screen is less than a first crosstalk degree threshold;
determining that crosstalk interference for the main screen caused by the secondary screen meets the quality requirement, when the degree of crosstalk for the main screen caused by the secondary screen is less than a second crosstalk degree threshold; and
determining that the crosstalk interference between the main screen and the secondary screen meets the quality requirement, when both the crosstalk interference for the secondary screen caused by the main screen and the crosstalk interference for the main screen caused by the secondary screen meet the quality requirement.

12. The method of claim 11, wherein the first crosstalk degree threshold and the second crosstalk degree threshold are set by customers.

13. The method of claim 1, wherein the first functional state comprises a display function, and the second functional state comprises a camera function.

14. The method of claim 1, wherein the secondary screen comprises one or more screens.

15. The method of claim 1, wherein the standard parameter value of crosstalk is a parameter value when crosstalk is 0, and the actual parameter value of crosstalk is a corresponding parameter value when crosstalk is not 0.

16. The method of claim 1, further comprising:
selecting positions of the n reference test points on the secondary screen firstly and selecting positions of the n comparative test points on the main screen according to the positions of the n reference test points on the secondary screen.

\* \* \* \* \*